(12) United States Patent
Drenten et al.

(10) Patent No.: US 8,690,406 B2
(45) Date of Patent: Apr. 8, 2014

(54) LIGHTING DEVICE AND METHOD OF GENERATING OUTPUT ILLUMINATION

(75) Inventors: Ronald R. Drenten, Eindhoven (NL); Josef A. Schug, Aachen (DE); Adriaan Valster, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 362 days.

(21) Appl. No.: 13/130,230

(22) PCT Filed: Nov. 11, 2009

(86) PCT No.: PCT/IB2009/055002
§ 371 (c)(1),
(2), (4) Date: May 19, 2011

(87) PCT Pub. No.: WO2010/058323
PCT Pub. Date: May 27, 2010

(65) Prior Publication Data
US 2011/0222265 A1 Sep. 15, 2011

(30) Foreign Application Priority Data
Nov. 21, 2008 (EP) .................................. 08169638

(51) Int. Cl.
*F21S 8/10* (2006.01)
(52) U.S. Cl.
USPC .......................................... 362/545; 362/539

(58) Field of Classification Search
USPC .................................................. 362/539, 545
See application file for complete search history.

(56) References Cited

U.S. PATENT DOCUMENTS

| | | | |
|---|---|---|---|
| 5,535,230 A | 7/1996 | Abe | |
| 6,102,552 A | 8/2000 | Tullis | |
| 7,150,552 B2 | 12/2006 | Weidel | |
| 2004/0228139 A1* | 11/2004 | Taniuchi | 362/539 |
| 2005/0105301 A1* | 5/2005 | Takeda et al. | 362/545 |
| 2008/0068852 A1* | 3/2008 | Goihl | 362/509 |
| 2009/0046474 A1* | 2/2009 | Sato et al. | 362/466 |

OTHER PUBLICATIONS

"Laser beam vehicle head lights and other lights", http://www.creativitypool.com/viewtopic.php?t=1814&hilit=theories, Captured at 13:47 hours Bangalore time, Jul. 25, 2008, SC-1.

* cited by examiner

*Primary Examiner* — Joseph L Williams
(74) *Attorney, Agent, or Firm* — Mark L. Beloborodov

(57) ABSTRACT

The invention relates to a lighting device for generating output illumination having at least one directional characteristic. The lighting device includes at least one light-emitting device and at least one optical element disposed in an optical path of the light-emitting device. The lighting device also includes a screen-like member for changing at least one physical property of light passing therethrough and an optical device for generating an intermediate image on the screen-like member. The screen-like member and the optical device are located in the optical path between the light-emitting device and the optical element projecting the intermediate image.

13 Claims, 4 Drawing Sheets

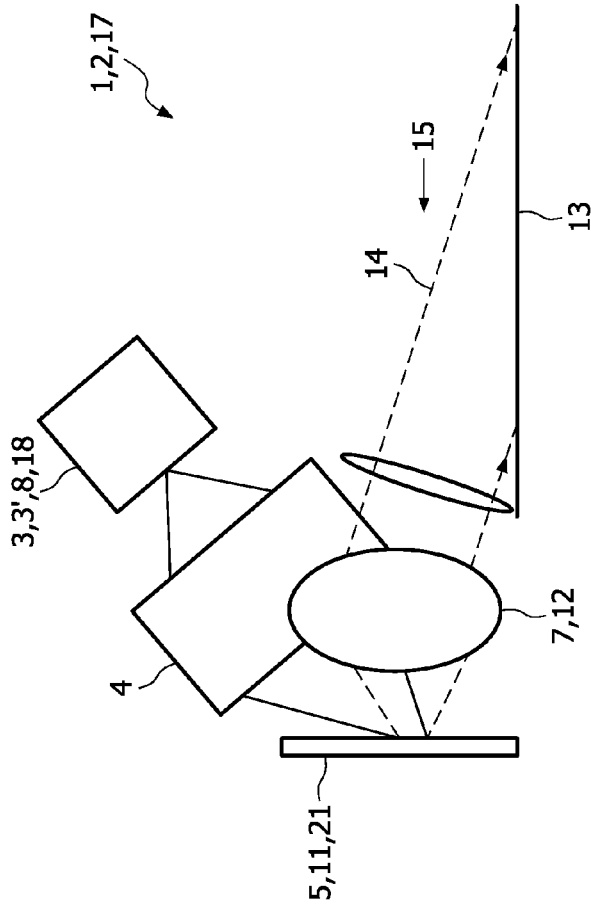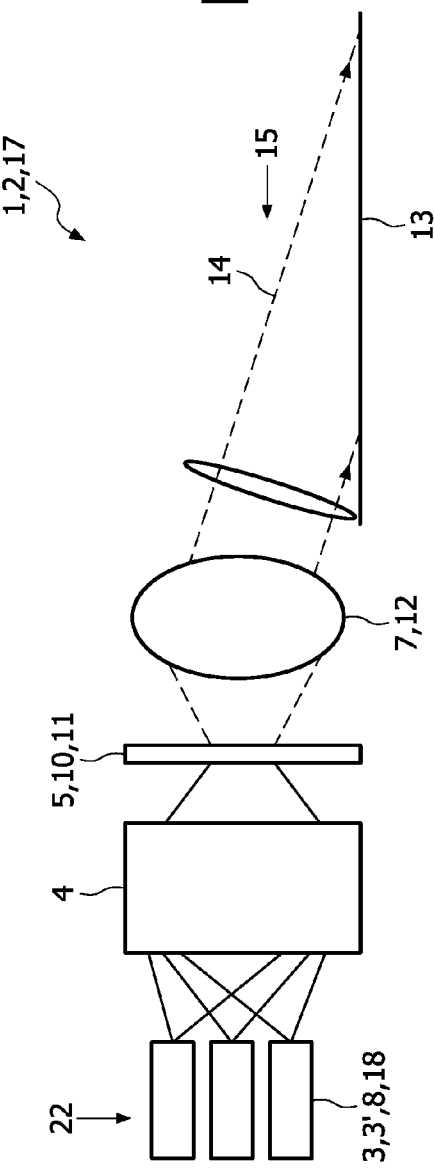

LIGHTING DEVICE AND METHOD OF GENERATING OUTPUT ILLUMINATION

FIELD OF THE INVENTION

The invention relates to a lighting device comprising at least one light-emitting device and at least one optical element in an optical path of the light-emitting device for generating output illumination having at least one directional characteristic.

BACKGROUND OF THE INVENTION

A lighting device comprising a light-emitting device is known, for example, as a vehicle lighting device. Current vehicle lighting devices are filament-based devices, discharge-based devices or Light Emitting Diode (LED)-based devices. To realize the prescribed illumination characteristic with sufficient accuracy, these lighting devices have a considerable mechanical volume, which is mainly caused by the relatively large size of existing light-emitting devices or light sources, such as incandescent and high-intensity discharge lamps and LEDs. Furthermore, it is difficult to obtain more than one illumination characteristic or beam pattern from a single lighting device. Current filament-based vehicle lighting devices can produce a "high beam" and a "low beam", addressable by switching between two different filaments.

In contemporary vehicles, e.g. passenger cars, there is a need for more different front lighting characteristics (e.g. parking light, daytime running light, side-pointing beam while making a turn, fog lights, and semi-high beam for use in situations with only distant oncoming traffic).

DE 42 28 895 A1 shows a lighting device which is formed as a vehicle lighting device and comprises a plurality of light-emitting devices formed as lasers for emitting light, and at least one optical element in an optical path of the light-emitting devices for generating output illumination having one static directional characteristic.

OBJECT AND SUMMARY OF THE INVENTION

It is an object of the invention to provide a compact lighting device which can generate illumination having a plurality of directional output characteristics.

To achieve this object, the lighting device according to the invention further comprises a screen-like member for changing at least one physical property of light passing through it and an optical device for generating an intermediate image on the screen-like member, both located in the optical path between the light-emitting device and the optical element, wherein the optical element is an optical element for projecting said image.

The lighting device can generate a plurality of different intermediate images using the light-emitting device as a light source and the optical device for forming and/or modifying the image. The optical device is located behind the light-emitting device in the direction of the emitted light. The optical element is a collimating element of the lighting device. The collimating element is located behind the intermediate screen-like member in the direction of the light leaving the screen-like member. The collimating optical element essentially converts space coordinates of the intermediate image generated on the screen-like member to angle coordinates of the output illumination having the designated directional characteristic. In this way, a compact lighting device is constructed, which can produce several differently shaped light cones all from one and the same device. The optical path is determined by the light-emitting device, the optical device, the screen-like member and the optical element.

The light-emitting device is preferably a laser (light amplification by stimulated emission of radiation) and/or a high luminance light-emitting device. The brightness (luminance) of a laser is at least a factor of 100 higher than the brightness achievable with conventional LEDs (~$10^9$ cd/m$^2$ versus ~$10^7$ cd/m$^2$). The laser is preferably a solid-state laser and/or a laser diode. In the present invention, the term "high-luminance light-emitting device" relates to a light-emitting device having a luminance which is equal to or higher than $4 \cdot 10^7$ cd/m$^2$ ($\geq 40$ candela per square millimeter equivalent to 40 mega nit: 40 Mcd/m$^2$).

By virtue of its much higher brightness, the lighting device comprising a high-luminance light-emitting device can be more compact than existing lighting devices comprising conventional Light Emitting Diodes (LEDs).

According to a preferred embodiment of the invention, the lighting device is a vehicle lighting device. In contemporary vehicles such as passenger cars, there is a need for more different front-lighting characteristics.

According to a preferred embodiment of the invention, the screen-like member further matches the directional characteristics of the light with different physical properties.

The physical property or properties of the light is/are the color and/or frequency of the light and/or the polarization of the light.

The intermediate screen-like member is preferably an at least partially transparent screen-like member or a reflective screen-like member. The reflective screen-like member preferably comprises a first sub-member for changing the at least one physical property of light passing through it, and a reflective second sub-member on the rear side of the first sub-member with respect to the light reflected by the reflective screen-like member.

In general, a plurality of different types of screen-like members can be used as manipulation members. The screen-like member is preferably a phosphor plate or a phosphor film. The light or light beam is used for pumping the phosphor plate or phosphor film. The phosphor plate or phosphor film is preferably made of a cerium-doped yttrium aluminum garnet phosphor (Ce-doped YAG phosphor) or a ceramic phosphor, particularly a "lumiramic" ceramic phosphor.

According to another preferred embodiment of the invention, the light-emitting device is a device emitting blue light and/or ultraviolet light. The blue light and/or ultraviolet light emitted by the light-emitting device is used for pumping the phosphor plate or the phosphor film—preferably made of a cerium-doped yttrium aluminum garnet phosphor and/or a ceramic phosphor—so as to create white light leaving the phosphor plate or the phosphor film. The screen-like member preferably matches the directional characteristics of the light with different colors.

In another preferred embodiment of the invention, the optical device comprises at least one scanning device. The image on the screen-like member is generated by Lissajous-like scanning or by line-by-line scanning of the light emitted by the light-emitting device, particularly the laser.

Additionally or alternatively, the optical device comprises at least one hologram device with at least one hologram. According to a preferred embodiment of the invention, the hologram is a fixed hologram and/or an interchangeable hologram and/or a controllable hologram.

According to a preferred embodiment of the invention, the lighting device comprises an aperture member for restricting a light cone of the output illumination. By using this aperture member, at least one of the output illuminations can have a sharp boundary line.

According to another preferred embodiment of the invention, the vehicle lighting device is a head light device lighting a region in front of the vehicle. The region is a region of the road or street on which the vehicle is passing.

The invention further relates to a method of generating output illumination having a plurality of directional characteristics, using at least one light-emitting device, an optical device, a screen-like member and at least one optical element for generating output illumination having the directional characteristic, the method comprising the steps of:

generating at least one intermediate image on the screen-like member by using light emitted by the light-emitting device and the optical device, changing at least one physical property of the light by means of said screen-like member, and projecting said image by means of the optical element.

The light-emitting device is preferably a laser, more preferably a semiconductor laser.

The change of the physical property of the light is preferably a change of the color and/or the polarization. More preferably, the light-emitting device is a device emitting blue light and/or ultraviolet light. The blue light and/or ultraviolet light emitted by the light-emitting device is used for pumping the screen-like member, which is formed as a phosphor plate or a phosphor film—preferably made of a cerium-doped yttrium aluminum garnet phosphor or a ceramic phosphor—so as to create white light leaving the phosphor plate or the phosphor film.

According to a preferred embodiment of the invention, the directional characteristic of the output illumination is changed by an alteration of the intermediate image and/or a change of an aperture by moving an aperture member for restricting a light cone of the output illumination.

BRIEF DESCRIPTION OF THE DRAWINGS

These and other aspects of the invention are apparent from and will be elucidated with reference to the embodiments described hereinafter.

In the drawings:

FIG. 2 shows the arrangement of a vehicle lighting device according to a second embodiment of the invention;

FIG. 3 shows the arrangement of a vehicle lighting device according to a third embodiment of the invention.

DESCRIPTION OF EMBODIMENTS

Figure 1A:
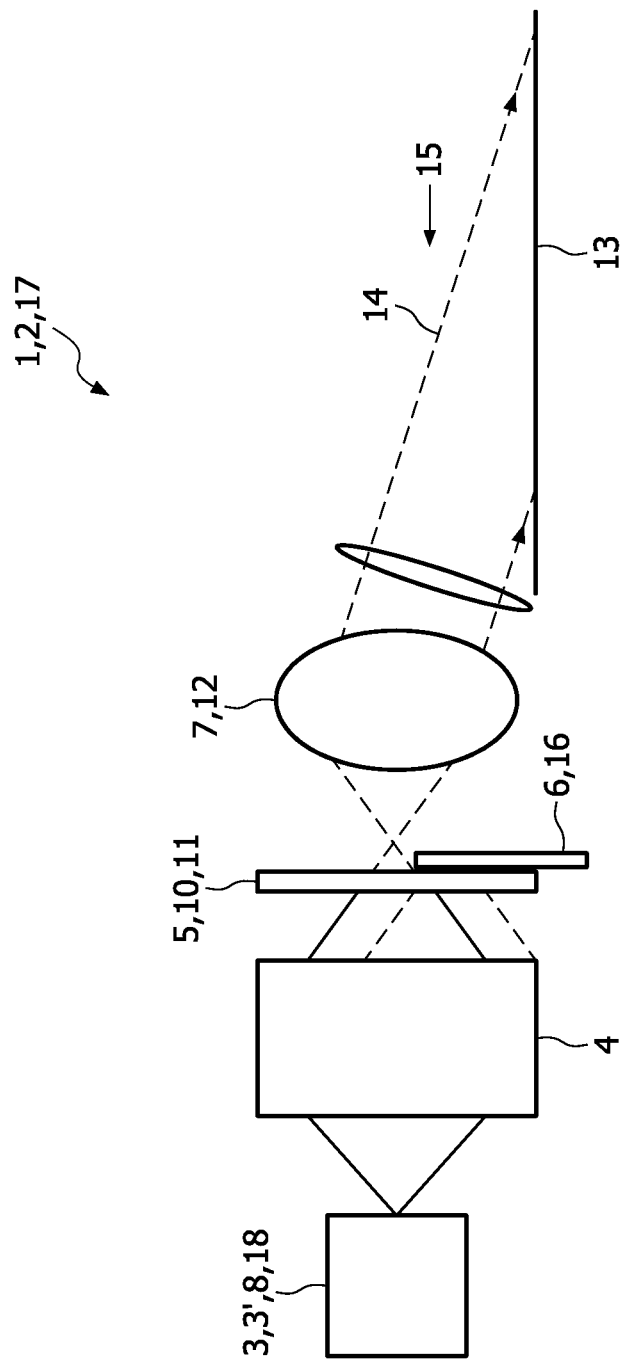
FIG. 1A shows the arrangement of a lighting device formed as a vehicle lighting device according to a first embodiment of the invention.

FIG. 1A shows a lighting device 1 formed as a vehicle lighting device 2, comprising a light-emitting device 3 formed as a laser 3' (light amplification by stimulated emission of radiation) emitting light (laser light), an optical device 4, a screen-like member 5, an additional aperture member 6, and an optical element 7. The laser 3 is a solid-state laser 8 (not shown), preferably a semiconductor laser. The optical device 4 is located behind the laser 3' in the direction of the emitted light. The optical device 4 deflects the light so as to generate an intermediate image 9 (shown in FIG. 1C) on the screen-like member 5. The screen-like member 5 is an at least partially transparent screen-like member 10 formed as a phosphor plate 11. The phosphor plate 11 manipulates at least one physical property of the light, namely its color. The self-luminous image 9 generated by the laser light striking on a first side of the transparent screen-like member 10 is visible at an opposite, second side of the transparent screen-like member 10. The optical element 7 is an optical element 12 for projecting the image 9 with a designated directional characteristic by means of a light cone 14 on an area 13 in front of the vehicle lighting device 1.

An optical path 15 of the lighting device 1 is determined by the laser 3', the optical device 4, the screen-like member 5 and the optical element 12. Additionally, the light cone 14 is restricted by the aperture member 6 located in one lateral off-axis section of the optical path 15 between the screen-like member 5 and the optical element 12. The aperture member 6 is formed as a knife-edge screen 16 for generating one sharp contour of the illumination having the designated output characteristic. The vehicle lighting devices 2 shown in FIGS. 1 to 3 are head light devices 17.

The lighting device 1 can generate a plurality of different intermediate images 9 on the screen-like member 5, using the light-emitting device 3, particularly the laser 3', as a light source and the optical device 4 for forming and/or modifying the image 9. The laser 2 is preferably a solid-state laser 8. The light-emitting device 3 is a device 18 emitting blue light and/or ultraviolet light. The blue light and/or ultraviolet light emitted by the light-emitting device 18 are used for pumping the phosphor plate 11 so as to create white light. Said phosphor plate 11 is preferably made of a cerium-doped yttrium aluminum garnet phosphor or a ceramic phosphor so as to create white light leaving the phosphor plate 11.

The optical element 12 is a collimating element 12 of the lighting device 1. The collimating element 12 is located behind the intermediate screen-like member 5 in the direction of the light leaving the screen-like member 5. The collimating element 12 essentially converts space coordinates of the intermediate image 9 generated on the screen-like member 5 to angle coordinates of the output illumination having the designated directional characteristic. In this way, a compact lighting device 1, particularly a compact vehicle lighting device 2, is constructed, which can produce several differently shaped light cones all from one and the same device 1.

Figure 1B:
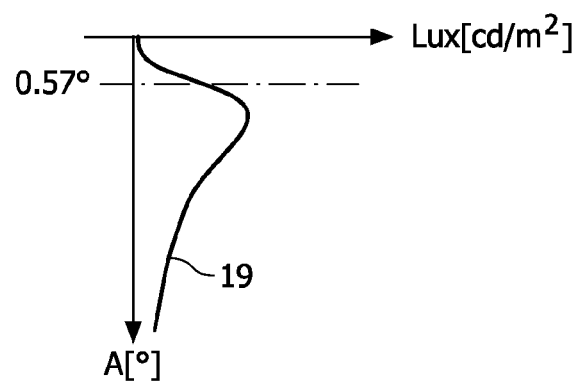
FIG. 1B shows the intensity characteristic curve of the illumination generated by the vehicle lighting device of FIG. 1A.

The output characteristic (the beam profiles) required for automotive head lights are subject to strict regulations. By way of illustration, the requirement for a "low beam" profile (R98—Motor vehicle headlamps equipped with gas-discharge light sources, in the vertical direction) is depicted in FIG. 1B. Between the horizon and the point which is 0.57° lower, the luminance is required to increase from 1 lux (max.) to 20 lux (min.). Such a contrast (of 1:20) is difficult to reach over a distance of about 300 µm in a regular cerium-doped yttrium aluminum garnet (Ce:YAG ceramic) phosphor plate 11 for an optical element 7 formed as a collimator lens having a focal length of 30 mm.

The diagram of FIG. 1B shows an intensity curve 19 (intensity versus angle of elevation) representing the requirement in a 120 µm thick phosphor plate 11 in which a brightness with a factor of 100 higher as compared to a head light device 17 based on conventional LED light sources is realized. This means that the focal length of the projecting optical element 12 should be of the order of 30 mm, which makes it difficult to reach sufficient coupling NA and hence sufficient coupling efficiency.

To reach an even higher contrast (maybe up to 1:200, because the collimating optics will generally decrease the available contrast on the road) special provisions may be needed, either by applying the knife-edge screen 16 and/or in the construction of the phosphor plate 11. The knife-edge screen 16 can be constructed to be movable by means of a motor, where it will be in position for producing a low beam, and removed for producing a high beam.

Figure 1C:
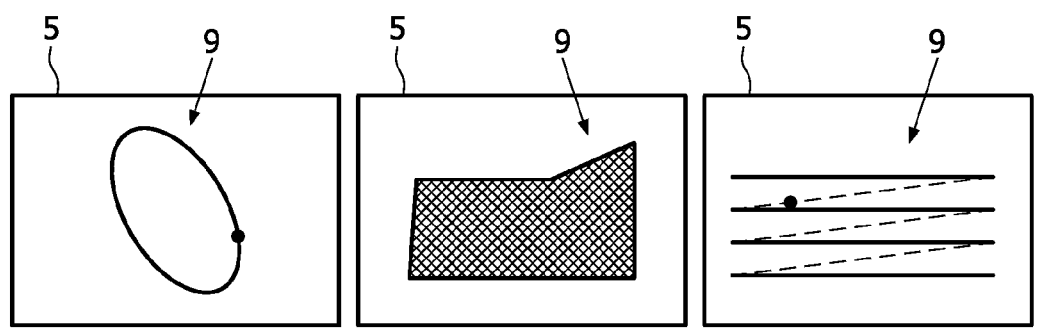
FIG. 1C schematically depicts different kinds of intermediate images on an intermediate screen-like member of the lighting device.

FIG. 1C is a side view taken on the second side of the screen-like member 5 with the image 9. The image 9 is generated on the member 5 in three different ways. The image 9 on the left side in FIG. 1C is generated by Lissajous-like scanning. The image 9 on the right side in FIG. 1C is generated by line-by-line scanning, and the image 9 in between is generated by holographic control using a hologram 20 shown in FIG. 4.

The invention is not only applicable to geometries in which the phosphor plate 11 is pumped on one side and the output beam emerges from the other side, but also to geometries in which the phosphor plate 11 is pumped on one side and the generated beam is emitted from the same side.

FIG. 2 shows a vehicle lighting device 1 with a reflective screen-like member 21. The reflective screen-like member 21 is preferably a phosphor plate 11 or a phosphor film with a reflective film on the rear side with respect to the light reflected by the reflective screen-like member 21.

For obtaining programmable laser-beam patterns, it is also possible to use more than one laser 3' and/or a laser array. Different light-emitting devices 3 or emission points can be placed in such a way that different parts of the phosphor plate 11 are illuminated, which yields programmability of the total beam pattern at the phosphor plate 11. FIG. 3 shows a lighting device 1 with three lasers 3' forming a laser system 22.

According to a further embodiment of the invention, the phosphor composition of the phosphor plate 11 or phosphor film is made spacially variable (variable as a function of the space coordinates across the phosphor plate 11), while the color of the emerging light (or laser beam) can be made variable by means of its angle of radiation (and hence different for different parts of the radiated pattern).

Figure 4A:
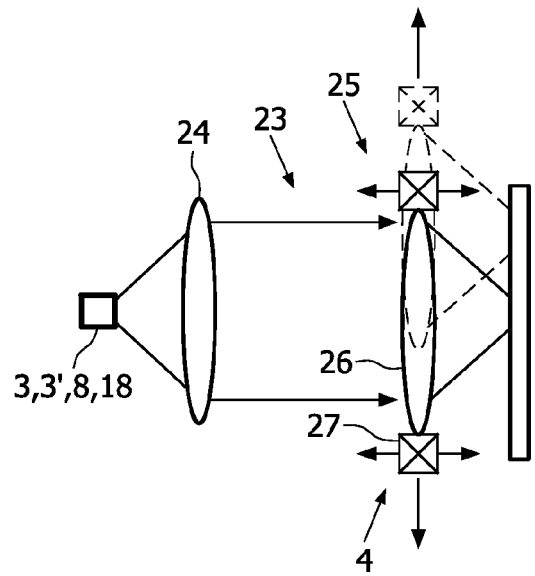
FIGS. 4A-4C shows three different embodiments of an optical device of the lighting device.
Figure 4B:
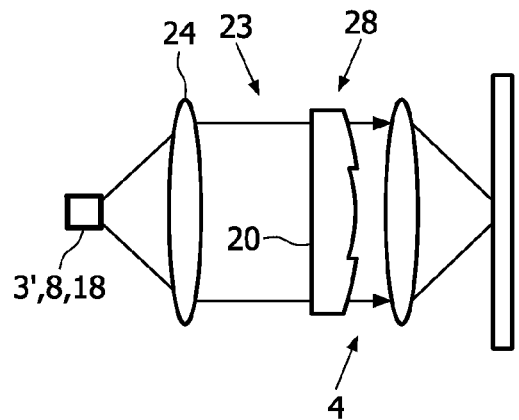
Figure 4C:
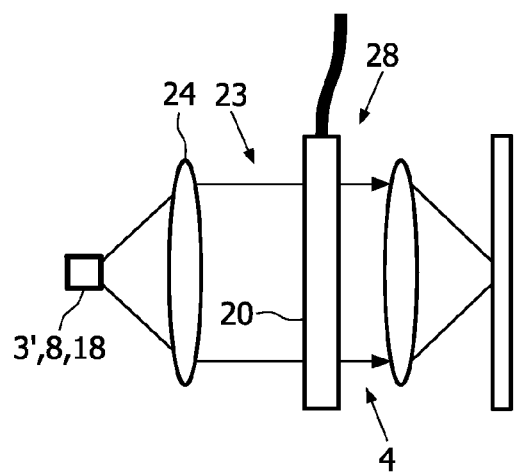

FIGS. 4A, 4B and 4C show three different assemblies of an arrangement 23 of the light-emitting device 3, particularly the laser 3', and the optical device 4. The arrangement 23 comprises the laser 3' emitting the laser light, a collimator lens 24 and the optical device 4. Within the arrangement 23, the optical device 4 is located behind the laser 3' and the collimator lens 24 in the direction of the collimated laser light. The optical device 4 deflects the laser light so as to generate the intermediate image 9 (shown in FIG. 1C) on the screen-like member 5. The optical device 4 shown in FIG. 4A comprises a scanning device 25. The scanning device 25 comprises a focusing lens 26 in a holder of an XYZ-manipulator 27 for moving the lens 26 in an XY-plane perpendicular to the collimated laser light (laser beam) and in the Z-direction of the collimated laser light for defocusing said lens 26. Such XYZ-manipulators 27 are well known in the field of CD and/or DVD-devices.

The optical device 4 shown in FIG. 4B comprises a hologram device 28. The hologram device 28 comprises the fixed hologram 20 or an interchangeable hologram 20, and a focusing lens 26. The optical device 4 shown in FIG. 4C comprises a hologram device 28 comprising a programmable hologram 20 and a focusing lens 26. The optical device 4 comprising the hologram device 28 uses the coherent laser light for generating a designated amplitude distribution of the intermediate image 9 at the intermediate screen-like member 5 by performing a Fourier transform.

The invention further relates to a method of generating output illumination having at least one directional characteristic, using the at least one light-emitting device 18 emitting blue light, the optical device 4, the phosphor plate 11 and the at least one optical element 12, the method comprising the steps of:
- generating the at least one intermediate image 9 on the screen-like member 3 by using light emitted by the light-emitting device 18 and the optical device 4,
- changing the color of the blue light by means of said phosphor plate 11 so as to generate white light, and
- projecting said image 9 by means of the optical element 12 for generating output illumination having the directional characteristic. This method is executed in the lighting device shown in FIGS. 1A, 2 and 3.

The invention has been illustrated and described in detail in the drawings and the foregoing description by way of non-limiting example and is not limited to the disclosed embodiments.

Other variations of the disclosed embodiments can be understood and effected by those skilled in the art in practicing the claimed invention, from a study of the drawings, the disclosure, and the appended claims. In the claims, use of the verb "comprise" and its conjugations does not exclude elements or steps other than those stated in a claim, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising
at least one light-emitting device,
at least one optical element disposed in an optical path of the light-emitting device for generating output illumination having at least one directional characteristic, and
a screen-like member for changing at least one physical property of light passing therethrough and an optical device for generating an intermediate image on the screen-like member, wherein the screen-like member and the optical device are located in the optical path between the light-emitting device and the optical element, wherein the optical element is configured for projecting said image.

2. A lighting device according to claim 1, wherein the light-emitting device is a high-luminance light-emitting device and/or a laser.

3. A lighting device according to claim 1, wherein the lighting device is a vehicle lighting device.

4. A lighting device according to claim 1, wherein the physical property of the light is the color of the light and/or the polarization of the light.

5. A lighting device according to claim 1, wherein the screen-like member is an at least partially transparent screen-like member or a reflective screen-like member.

6. A lighting device according to claim 1, wherein the screen-like member is a phosphor plate or a phosphor film.

7. A lighting device according to claim 1, wherein the light-emitting device is a light-emitting device emitting blue light and/or ultraviolet light.

8. A lighting device according to claim 1, wherein the optical device comprises at least one scanning device.

9. A lighting device according to claim 1, wherein the optical device comprises at least one hologram device with at least one hologram.

10. A lighting device according to claim 9, wherein the hologram is a fixed hologram and/or an interchangeable hologram and/or a controllable hologram.

11. A lighting device according to claim 1, wherein the lighting device further comprises an aperture member for restricting a light cone of the output illumination.

12. A method of generating output illumination having a plurality of directional characteristics, using at least one light-emitting device, an optical device, a screen-like member and at least one optical element for generating output illumination having a directional characteristic, the method comprising the steps of:
- generating at least one intermediate image on the screen-like member by using light emitted by the light-emitting device and the optical device,
- changing at least one physical property of the light by means of said member, and
- projecting said image by means of the optical element, wherein the screen-like member and the optical device are located in the optical path between the light-emitting device and the optical element.

13. A method according to claim 12, wherein the directional characteristic of the output illumination is changed by an alteration of the intermediate image and/or a change of an aperture by moving an aperture member for restricting a light cone of the output illumination.

* * * * *